(12) United States Patent
Tamura

(10) Patent No.: US 10,863,417 B2
(45) Date of Patent: Dec. 8, 2020

(54) COMMUNICATION SYSTEM, MANAGEMENT APPARATUS, COMMUNICATION TERMINAL, COMMUNICATION CONTROL METHOD, SENSOR INFORMATION TRANSMISSION METHOD, AND COMPUTER READABLE MEDIUM

(71) Applicant: NEC Corporation, Tokyo (JP)

(72) Inventor: Toshiyuki Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/559,629

(22) PCT Filed: Mar. 11, 2016

(86) PCT No.: PCT/JP2016/001403
§ 371 (c)(1),
(2) Date: Sep. 19, 2017

(87) PCT Pub. No.: WO2016/152071
PCT Pub. Date: Sep. 29, 2016

(65) Prior Publication Data
US 2018/0070289 A1 Mar. 8, 2018

(30) Foreign Application Priority Data

Mar. 20, 2015 (JP) ................. 2015-057346

(51) Int. Cl.
*H04W 48/04* (2009.01)
*H04M 1/00* (2006.01)
(Continued)

(52) U.S. Cl.
CPC ............. *H04W 48/04* (2013.01); *H04M 1/00* (2013.01); *H04M 11/00* (2013.01); *H04W 4/027* (2013.01);
(Continued)

(58) Field of Classification Search
CPC ..... H04W 12/08; H04W 4/008; H04W 36/32; H04W 48/02; H04W 48/04; H04W 4/003;
(Continued)

(56) References Cited

U.S. PATENT DOCUMENTS 6,188,315 B1 * 2/2001 Herbert ............... B60R 16/0232
340/438
8,666,382 B2 3/2014 Silver
(Continued)

FOREIGN PATENT DOCUMENTS

CN 100583669 C 1/2010
EP 1 156 695 A2 11/2001
(Continued)

OTHER PUBLICATIONS

International Search Report corresponding to PCT/JP2016/001403, dated May 31, 2016 (5 pages).
(Continued)

*Primary Examiner* — Nimesh Patel
(74) *Attorney, Agent, or Firm* — Wilmer Cutler Pickering Hale and Dorr LLP

(57) ABSTRACT

A communication system according to the present disclosure includes a core network apparatus and a management apparatus. The management apparatus includes a reception unit for receiving sensor information detected by a communication terminal (40) via the core network, an evaluation unit for evaluating whether or not the sensor information indicates that the communication terminal is moving, a transmission unit for transmitting information instructing the core network apparatus to stop communication related to the communication terminal to the core network apparatus. The core network apparatus includes a communication control unit for, when the communication control unit receives the information instructing the core network apparatus to stop
(Continued)

the communication related to the communication terminal, stopping transmission of data to the communication terminal and stopping transmission of data transmitted from the communication terminal to another communication apparatus.

12 Claims, 9 Drawing Sheets

(51) Int. Cl.
| | |
|---|---|
| *H04W 88/18* | (2009.01) |
| *H04M 11/00* | (2006.01) |
| *H04W 76/30* | (2018.01) |
| *H04W 4/02* | (2018.01) |
| *H04W 64/00* | (2009.01) |
| *H04W 4/20* | (2018.01) |
| *H04W 76/00* | (2018.01) |
| *H04W 4/029* | (2018.01) |
| *H04W 76/18* | (2018.01) |

(52) U.S. Cl.
CPC ......... *H04W 64/003* (2013.01); *H04W 76/30* (2018.02); *H04W 88/18* (2013.01); *H04W 4/029* (2018.02); *H04W 4/20* (2013.01); *H04W 76/00* (2013.01); *H04W 76/18* (2018.02)

(58) Field of Classification Search
CPC . H04W 4/206; H04W 76/021; H04W 84/005; H04W 84/18; H04W 4/023; H04W 4/00; H04W 4/02; H04W 88/06; H04W 64/006; H04W 36/0083; H04W 88/02; H04W 72/042; H04W 72/082; H04W 24/02; H04W 74/004; H04W 28/06; H04W 48/10; H04W 4/027; H04W 4/40; H04W 4/48; H04W 4/029; H04W 4/046; H04W 4/025; H04W 4/026; H04W 4/04; H04W 4/16; H04W 36/36; H04W 60/04; H04L 5/0055; H04L 1/1812; H04L 1/0026; H04L 1/0009; H04L 1/0003; H04L 1/01; H04L 5/0073; H04L 1/0027; H04L 2025/03426; H04L 47/10; H04L 47/14; H04L 1/0019; H04L 1/0017; H04L 5/0053; H04L 5/0007; H04L 5/001; H04L 1/1845; H04L 1/1854; H04L 2025/03414; H04M 1/72577; H04M 2250/10; H04M 1/6091; H04M 1/72569; H04M 2250/02; H04M 1/72519; H04M 1/7253; H04M 1/6075; H04M 1/72538; H04M 2250/12; H04M 1/6066; H04M 1/72536; H04M 1/72552; H04M 1/72583; H04M 2250/04; H04M 2250/52; G08G 1/20; G08G 1/0112; G08G 1/012; G08G 1/096716; G08G 1/096741; G08G 1/096775; G06F 1/3231; G06F 1/3287; G01S 19/52; G01S 7/022; G01S 19/14; Y02D 10/173; Y02D 70/142; Y02D 70/146; Y02D 70/23

See application file for complete search history.

(56) References Cited

U.S. PATENT DOCUMENTS

| | | | |
|---|---|---|---|
| 2001/0044312 A1* | 11/2001 | Yamane | H04W 4/029 455/456.6 |
| 2006/0099966 A1* | 5/2006 | Moton, Jr. | H04L 41/12 455/456.3 |
| 2006/0252432 A1* | 11/2006 | Gruchala | H04M 3/436 455/456.3 |
| 2008/0299954 A1 | 12/2008 | Wright et al. | |
| 2008/0299959 A1 | 12/2008 | Geyer et al. | |
| 2008/0305779 A1 | 12/2008 | Wright et al. | |
| 2008/0305780 A1 | 12/2008 | Williams et al. | |
| 2008/0305808 A1 | 12/2008 | Chan et al. | |
| 2008/0318562 A1 | 12/2008 | Featherstone et al. | |
| 2009/0002147 A1* | 1/2009 | Bloebaum | H04M 1/6075 340/466 |
| 2009/0312038 A1* | 12/2009 | Gildea | G01S 19/52 455/456.4 |
| 2010/0062788 A1* | 3/2010 | Nagorniak | H04W 48/04 455/456.1 |
| 2011/0009107 A1* | 1/2011 | Guba | G08G 1/20 455/418 |
| 2011/0263240 A1 | 10/2011 | Featherstone et al. | |
| 2011/0269441 A1 | 11/2011 | Silver | |
| 2012/0052834 A1* | 3/2012 | Riggs | H04W 4/027 455/404.2 |
| 2012/0202185 A1* | 8/2012 | Jabara | G09B 5/00 434/350 |
| 2012/0264409 A1 | 10/2012 | Geyer et al. | |
| 2014/0011520 A1 | 1/2014 | Chan et al. | |
| 2014/0057616 A1 | 2/2014 | Featherstone et al. | |
| 2014/0171058 A1 | 6/2014 | Silver | |
| 2014/0199987 A1 | 7/2014 | Wright et al. | |
| 2015/0172442 A1 | 6/2015 | Wright et al. | |
| 2015/0223053 A1* | 8/2015 | Gillin, IV | G09B 5/06 455/418 |
| 2015/0282009 A1* | 10/2015 | Iwai | H04W 24/10 455/436 |
| 2015/0304937 A1 | 10/2015 | Kim et al. | |
| 2016/0374004 A1 | 12/2016 | Silver | |
| 2017/0142706 A1 | 5/2017 | Kim et al. | |
| 2018/0091968 A1* | 3/2018 | Ly | H04W 8/08 |
| 2018/0132163 A1 | 5/2018 | Silver | |

FOREIGN PATENT DOCUMENTS

| | | |
|---|---|---|
| JP | 2001-326976 A | 11/2001 |
| JP | 2003-018654 A | 1/2003 |
| JP | 2003-298690 A | 10/2003 |
| JP | 2015-228575 A | 12/2015 |
| WO | WO-01/56307 A2 | 8/2001 |
| WO | WO-2008/109477 A1 | 9/2008 |
| WO | WO-2014/084596 A1 | 6/2014 |

OTHER PUBLICATIONS

Stop smartphone-use while walking application, the Internet, URL:http://www.au.kddi.com/mobile/srvice/smartphone/safety/aruki-sumaho/, KDDI Corporation, Feb. 25, 2015 (3 pages).

Extended European Search Report issued by the European Patent Office for European Application No. 16767980.2 dated Aug. 8, 2018 (11 pages).

Indian Examination Report issued in Indian Patent Application No. 201717032986, dated Oct. 29, 2019, 6 pages.

* cited by examiner

COMMUNICATION SYSTEM, MANAGEMENT APPARATUS, COMMUNICATION TERMINAL, COMMUNICATION CONTROL METHOD, SENSOR INFORMATION TRANSMISSION METHOD, AND COMPUTER READABLE MEDIUM

CROSS-REFERENCE TO RELATED APPLICATIONS

This application is a national stage application of International Application No. PCT/JP2016/001403 entitled "COMMUNICATION SYSTEM, MANAGEMENT APPARATUS, COMMUNICATION TERMINAL, COMMUNICATION CONTROL METHOD, SENSOR INFORMATION TRANSMISSION METHOD, AND COMPUTER READABLE MEDIUM," filed on Mar. 11, 2016, which claims priority to Japanese Patent Application No. 2015-057346, filed on Mar. 20, 2015, the disclosures of each which are hereby incorporated by reference in their entirety.

TECHNICAL FIELD

The present disclosure relates to a communication system, a management apparatus, a communication terminal, a communication control method, a sensor information transmission method, and a program. More specifically, the present disclosure relates to a communication system, a management apparatus, a communication terminal, a communication control method, a sensor information transmission method, and a program that perform control using sensor information.

BACKGROUND ART

Recently, smartphones are rapidly becoming widespread, and many users use smartphones. Many users carry smartphones, and in some cases, they are using smartphones while moving. The manner of the users who use smartphones and the like have been seen as a problem. Another problem is that there is a possibility that the user may fall over or come into contact with a person or an object. For example, when the user uses a smartphone while walking or riding a bicycle, the user's attention is attracted to the screen of the smartphone, thereby narrowing the user's field of view. For this reason, the user using the smartphone may come into contact with a person around him/her, collide with a vehicle, or fall over. Recently, such bad manners and inattention of the users such as using smartphones while walking or riding a bicycle have become a social problem.

In this regard, Non Patent Literature 1 discloses that when a user is detected to be using a smartphone while walking, a warning screen is displayed on a screen of the smartphone. To be more specific, Non Patent Literature 1 discloses control to be performed in which an application installed on the smartphone detects the user using the smartphone while walking, and then the warning screen is displayed on the screen of the smartphone. Non Patent Literature 1 further discloses that when the application detects the walking has stopped, the warning screen automatically disappears.

CITATION LIST

Non Patent Literature

Non Patent Literature 1: Stop smartphone-use while walking application, [online], [searched on Feb. 25, 2015], the Internet, <URL:http://www.au.kddi.com/mobile/service/smartphone/safety/aruki-sumaho/>

SUMMARY OF INVENTION

Technical Problem

In Non Patent Literature 1, the application installed on the smartphone detects an act of the user using the smartphone while walking and displays the warning screen. Therefore, there is a problem that when the user uninstalls the application from the smartphone or deactivates the operation of the application, the application cannot detect the act of the user using the smartphone while walking and thus cannot display the warning screen.

An object of the present disclosure is to provide a communication system, a management apparatus, a communication terminal, a communication control method, a sensor information transmission method, and a program that can stop the act of the user using the communication terminal while moving regardless of his/her intention.

Solution to Problem

In a first example aspect of the present disclosure, a communication system includes; a core network apparatus disposed in a core network; and a management apparatus configured to communicate with the core network apparatus. The management apparatus includes: a reception unit for receiving sensor information detected by a communication terminal via the core network; an evaluation unit for evaluating as to whether or not the sensor information indicates that the communication terminal is moving; and a transmission unit for, when the evaluation of the sensor information indicates that the communication terminal is moving, transmitting information instructing the core network apparatus to stop communication related to the communication terminal to the core network apparatus. The core network apparatus includes a communication control unit for, when the communication control means receives the information instructing the core network apparatus to stop the communication related to the communication terminal, stopping transmission of data to the communication terminal and stopping transmission of data transmitted from the communication terminal to another communication apparatus.

In a second example aspect of the present disclosure, a management apparatus includes: a reception unit for receiving sensor information detected by a communication terminal via a core network; and a transmission unit for transmitting, when the sensor information indicates that the communication terminal is moving, information instructing a core network apparatus to stop communication related to the communication terminal to the core network apparatus disposed in the core network, the core network apparatus controlling communication of data related to the communication terminal.

In a third example aspect of the present disclosure, a communication terminal includes a communication unit for evaluating as to whether or not to stop communication related to a communication terminal which is moving by using sensor information and transmitting the sensor information detected by the communication terminal to a management apparatus via a core network, the management apparatus transmitting a result of the evaluation to a core network apparatus disposed in the core network, and the core network apparatus controlling the communication related to the communication terminal.

In a fourth example aspect of the present disclosure, a communication control method includes: receiving sensor information detected by a communication terminal via a core network; evaluating as to whether or not the sensor information indicates that the communication terminal is moving; and transmitting, when the evaluation of the sensor information indicates that the communication terminal is moving, information instructing a core network apparatus to stop communication related to the communication terminal to the core network apparatus disposed in the core network, the core network apparatus controlling communication of data related to the communication terminal.

In a fifth example aspect of the present disclosure, a sensor information transmission method includes evaluating as to whether or not to stop communication related to a communication terminal which is moving by using sensor information and transmitting the sensor information detected by the communication terminal to a management apparatus via a core network, the management apparatus transmitting a result of the evaluation to a core network apparatus disposed in the core network, and the core network apparatus controlling the communication related to the communication terminal.

In a sixth example aspect of the present disclosure, a computer is caused to execute: receiving sensor information detected by a communication terminal via a core network; evaluating as to whether or not the sensor information indicates that the communication terminal is moving; and transmitting, when the evaluation of the sensor information indicates that the communication terminal is moving, information instructing a core network apparatus to stop communication related to the communication terminal to the core network apparatus disposed in the core network, the core network apparatus controlling communication of data related to the communication terminal.

Advantageous Effects of Invention

According to the present disclosure, it is possible to provide a communication system, a management apparatus, a communication terminal, a communication control method, a sensor information transmission method, and a program that can stop an act of a user using the communication terminal while moving regardless of his/her intention.

DESCRIPTION OF EMBODIMENTS

First Embodiment

Figure 1:
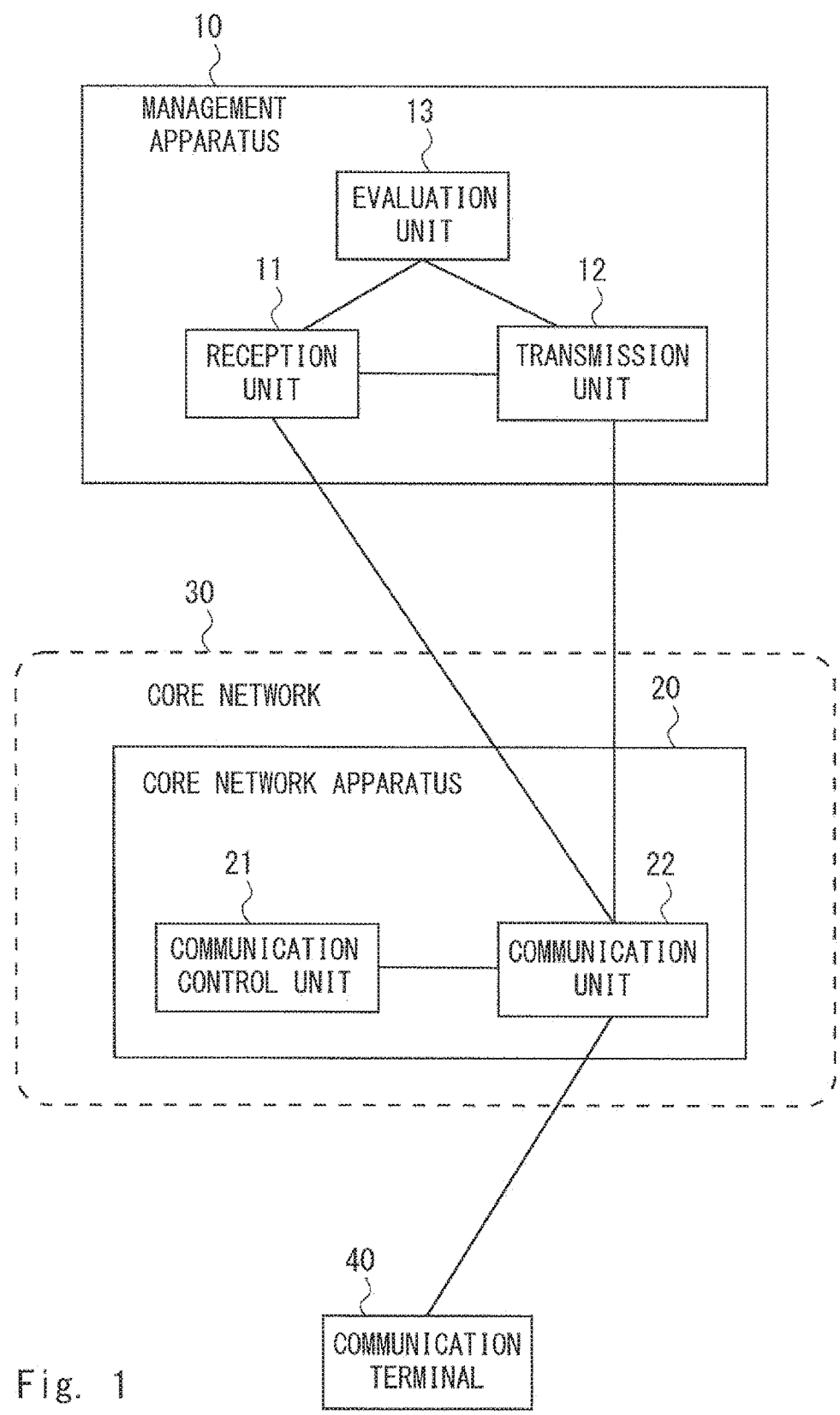
FIG. 1 is a configuration diagram of a communication system according to a first embodiment.

Hereinafter, embodiments of the present disclosure will be described with reference to the drawings. Firstly, a configuration example of a communication system according to a first embodiment of the present disclosure will be described with reference to FIG. 1. The communication system of FIG. 1 includes a management apparatus 10, a core network apparatus 20, and a communication terminal 40. The core network apparatus 20 is disposed in a core network 30.

The communication terminal 40 may be a mobile phone terminal, a smart phone, or the like, or it may be an M2M (Machine to Machine) terminal that autonomously communicates without user's operations and the like.

The core network 30 may be, for example, a network managed by a mobile network operator and may be a network composed of a node apparatus used for call processing control and the like. The core network apparatus 20 may be a node apparatus constituting the core network 30.

The management apparatus 10 communicates with the core network apparatus 20. The management apparatus 10 may communicate with the core network apparatus 20 via an interface with a protocol used for the communication determined in advance.

Next, a configuration example of the management apparatus 10 will be described. The management apparatus 10 may be a computer apparatus that operates by a processor executing a program stored in a memory. Further, the management apparatus 10 may be a server apparatus.

The management apparatus 10 includes a reception unit 11, a transmission unit 12, and an evaluation unit 13. The reception unit 11, the transmission unit 12, and the evaluation unit 13 may be software or modules, processing thereof is executed by the processor executing a program. The reception unit 11, the transmission unit 12, and the evaluation unit 13 may be each composed of a circuit or the like.

The reception unit 11 receives sensor information detected by the communication terminal 40 via the core network 30. For example, the reception unit 11 receives the sensor information detected by the communication terminal 40 as user data. The user data may be referred to as U (User)-Plane data. The receiving via the core network 30 may indicate receiving, in the core network 30, the user data via the core network apparatus 20 used for sending the user data.

The evaluation unit 13 evaluates as to whether or not the sensor information indicates that the communication terminal 40 is moving. The sensor information may be, for example, GPS information indicating a position of the user holding the communication terminal 40 or speed information indicating a moving speed or the like of the user. For example, when the position indicated by the GPS (Global Positioning System) information is away from the position indicated by the GPS information received last time by a predetermined distance, the evaluation unit 13 may evaluate that the communication terminal 40 is moving. Alternatively, when the information indicated by the speed information indicates a value equal to or greater than a predetermined speed, the evaluation unit 13 may evaluate that the communication terminal 40 is moving When the sensor information received by the reception unit 11 indicates that the communication terminal 40 is moving, the transmission unit 12 transmits information instructing the core network apparatus 20 to stop communication related to the communication terminal 40. The communication related to the communication terminal 40 may be, for example, voice communication for transmitting and receiving voice data, or data communication for transmitting and receiving text information, image information, moving image information, and the like.

Next, a configuration example of the core network apparatus 20 will be described. The core network apparatus 20 includes a communication control unit 21 and a communication unit 22. The communication unit may be referred to as a transmitting and receiving unit. The communication control unit 21 receives the information indicating a stop of the communication related to the communication terminal 40 from the management apparatus 10 via the communication unit 22. When the communication control unit 21 receives the information indicating a stop of the communication related to the communication terminal 40, it stops transmitting data to the communication terminal 40 and stops transmitting data transmitted from the communication terminal 40 to another communication apparatus.

For example, when the communication control unit 21 receives data addressed to the communication terminal 40, it may discard or dispose of the received data, while when the communication control unit 21 receives data with the communication terminal 40 as a transmission source, it may discard or dispose of the received data.

As described above, by using the communication system of FIG. 1, the management apparatus 10 and the core network 30 can prevent the communication of the communication terminal 40, which is moving, from being continued. Further, the communication terminal 40 is made to stop sending data related to the communication terminal 40 by the core network 30. That is, the communication terminal 40 is made to stop sending data related to the communication terminal 40 by control of the network. Therefore, the communication related to the communication terminal 40 is stopped regardless of the intention of the user operating the communication terminal 40. In this way, it is possible to stop an act of the user operating the communication terminal 40 while moving regardless of his/her intention.

Second Embodiment

Next, a configuration example of a communication system according to a second embodiment of the present disclosure will be described with reference to FIG. 2. The communication system of FIG. 2 includes a UE (User Equipment) 51, an eNB (evolved NodeB) 52, an MME (Mobility Management Entity) 53, an SGW (Serving Gateway) 54, a PGW (Packet Data Network Gateway) 55, an HSS (Home Subscriber Server) 56, an SCEF (Service Creation Environment Function) 57, a PCRF (Policy and Charging Rules Function) 58, and a management server 15.

The eNB 52, the MME 53, the SGW 54, the PGW 55, the HSS 56, the SCEF 57, and the PCRF 58 constitute an Evolved Packet System (EPS). The management server 15 corresponds to the management apparatus 10 in FIG. 1.

The UE 51 is a generic term for mobile communication terminals in 3rd Generation Partnership Project (3GPP). The UE 51 corresponds to the communication terminal 40 in FIG. 1. The eNB 52 is a base station apparatus compatible with LTE (Long Term Evolution) which is a wireless communication scheme defined by 3GPP.

The MME 53 is a node apparatus that controls call processing related to the UE 51. To be more specific, the MME 53 selects the SGW 54 and the PGW 55 to be used when the UE 51 performs communication. Further, the MME 53 obtains subscriber information on the UE 51 stored in the HSS 56 and performs call processing using the subscriber information. The data used by the MME 53 to control the call processing may be referred to as control data or C (Control)-Plane data.

The SGW 54 and the PGW 55 send the user data related to the UE 51. The user data may be referred to as U-Plane data. The HSS 56 manages subscriber data related to a plurality of UEs including the UE 51.

The SCEF 57 is an apparatus that executes authentication processing and the like related to the management server 15 when it executes the service requested by the management server 15 and the like. The PCRF 58 is an apparatus that performs policy control or charging control in EPS.

The operator service network 61 is a network composed of a node apparatus for executing services provided by a telecommunications carrier or the like that manages EPS. For example, the services provided by the telecommunications carrier or the like may be IMS (IP Multimedia Subsystem) that performs call control related to the voice communication. The node apparatus constituting the IMS may be, for example, a CSCF (Call Session Control Function) or the like.

The external service network 62 is a network different from the EPS and may be so-called the Internet or the like. Alternatively, the external service network 62 may be a network managed by a telecommunications carrier different from the telecommunications carrier managing the EPS.

Figure 3:
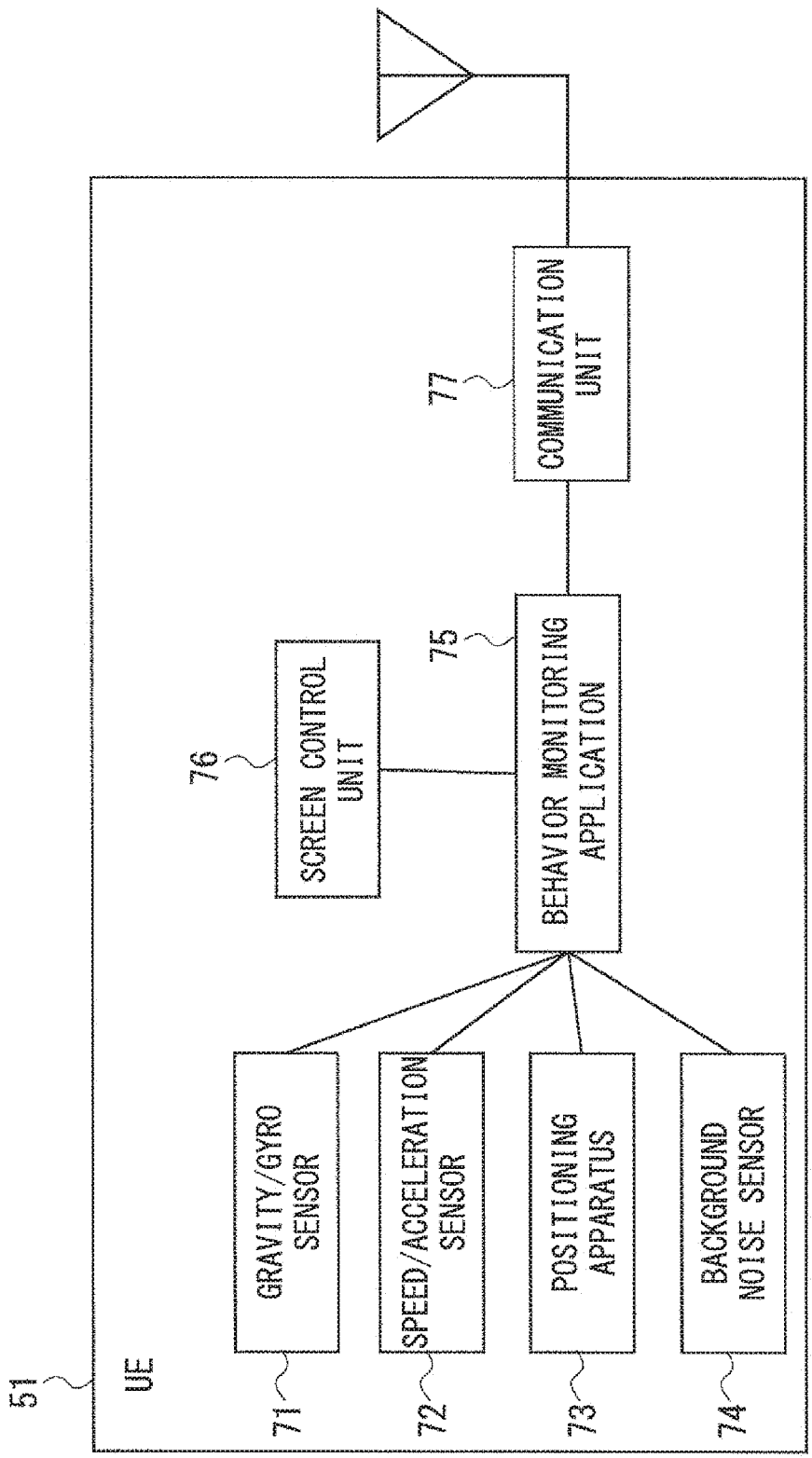
FIG. 3 is a configuration diagram of a UE according to the second embodiment.

Next, a configuration example of the UE 51 will be described with reference to FIG. 3. The UE 51 may be a computer apparatus, processes thereof is executed by a processor executing a program stored in a memory. The UE 51 includes a gravity/gyro sensor 71, a speed/acceleration sensor 72, a positioning apparatus 73, a background noise sensor 74, a behavior monitoring application 75, a screen control unit 76, and a communication unit 77. The behavior monitoring application 75, the screen control unit 76, and the communication unit 77 may be software or modules, processing thereof is executed by the processor executing a program. The screen control unit 76 and the communication unit 77 may each be composed of a circuit.

The gravity/gyro sensor 71 is, for example, a sensor that detects tilt, vibration, rotation, and the like of the UE 51. The speed/acceleration sensor 72 is, for example, a sensor that detects the moving speed and the like of the UE 51. The positioning apparatus 73 is, for example, a sensor that measures the position of the UE 51 using GPS. The background noise sensor 74 is, for example, a sensor for detecting sound around the UE 51.

The gravity/gyro sensor 71, the speed/acceleration sensor 72, the positioning apparatus 73, and the background noise sensor 74 output the detected sensor information to the behavior monitoring application 75.

The behavior monitoring application 75 analyzes the received sensor information and identifies the behavior of the UE 51. For example, the behavior monitoring application 75 may use the information output from the gravity/gyro sensor 71 to analyze whether the vibration is vibration detected during walking or vibration detected while riding on a bicycle. The behavior monitoring application 75 may use the information on the moving speed output from the speed/acceleration sensor 72 and the information on the vibration output from the gravity/gyro sensor 71 to identify whether or not the user who is holding the UE 51 is walking or riding a bicycle.

Further, the behavior monitoring application 75 may analyze the information on the voice output from the background noise sensor 74 to estimate the situation around the UE 51. For example, if an announcement of a station name is periodically included in the sound output from the background noise sensor 74, the behavior monitoring application 75 may estimate that the user holding the UE 51 is moving by a train.

The behavior monitoring application 75 transmits the analyzed information or the sensor information output from various sensors to the management server 15 via the communication unit 77.

When it is necessary to notify the user holding the UE 51 to stop using the UE 51 and the like based on a result of the analysis by the behavior monitoring application 75, the screen control unit 76 displays a warning message on a screen of the UE 51.

The communication unit 77 transmits or receives data by performing wireless communication with the eNB 52. For example, the communication unit 77 transmits the analysis information, the sensor information, and the like output from the behavior monitoring application 75 to the management server 15 via the EPS. The communication unit 77 may perform wireless communication with the eNB 52 using LTE as a communication scheme.

Next, a flow of an Attach procedure according to the second embodiment of the present disclosure will be described with reference to FIG. 4. Firstly, the UE 51 transmits an Attach Request message to the MME 53 via the eNB 52, for example, when the power is turned on (S11). Next, the MME 53 transmits an Update Location Request message to the HSS 56 in order to obtain the subscriber information on the UE 51 (S12).

Next, in response to the Update Location Request message, the HSS 56 transmits an Update Location Ack message to the MME 53 (S13). The HSS 56 sets information on an APN(s) (Access Point Name(s)) that is connectable to the management server 15 in the Update Location Ack message.

Next, the MME 53 selects the SGW 54 and the PGW 55 that relay the user data related to the UE 51 and transmits a Create Session Request message to the SGW 54 (S14). The SGW 54 transmits the received Create Session Request message to the PGW 55 (S14).

Next, the PGW 55 performs a process of setting QoS (Quality of Service) to be applied in data transmission related to the UE 51 with the PCRF 58 (S15). In other words, the PGW 55 performs a negotiation process with the PCRF 58 in order to determine a QoS value to be applied in the data transmission related to the UE 51.

Next, in response to the Create Session Request message, the PGW 55 transmits a Create Session Response message to the SGW 54 (S16). The SGW 54 transmits the received Create Session Response message to the MME 53 (S16).

Next, the MME 53, the eNB 52, and the UE 51 perform a wireless setting process between the UE 51 and the eNB 52 (S17). The MME 53 may notify the UE 51 of the information on the APN(s) that is connectable to the management server 15 received in Step S13 in the wireless setting process in Step S17. Next, When the MME 53 completes the wireless setting process between the UE 51 and the eNB 52, it transmits a Modify Bearer Request message to the SGW 54 (S18). Next, in response to the Modify Bearer Request message, the SGW 54 transmits a Modify Bearer Response message to the MME 53 (S19).

By executing the processing of Steps S11 to S19, a path or a tunnel for transmitting/receiving the user data is established between the UE 51 and the PGW 55. Thus, the UE 51 is ready to communicate with the management server 15 via the PGW 55 (S20). For example, after the processing from Steps S11 to S19 is executed, the UE 51 can transmit the analysis information, the sensor information, and the like generated by the behavior monitoring application 75 to the management server 15 via the EPS.

Figure 4:
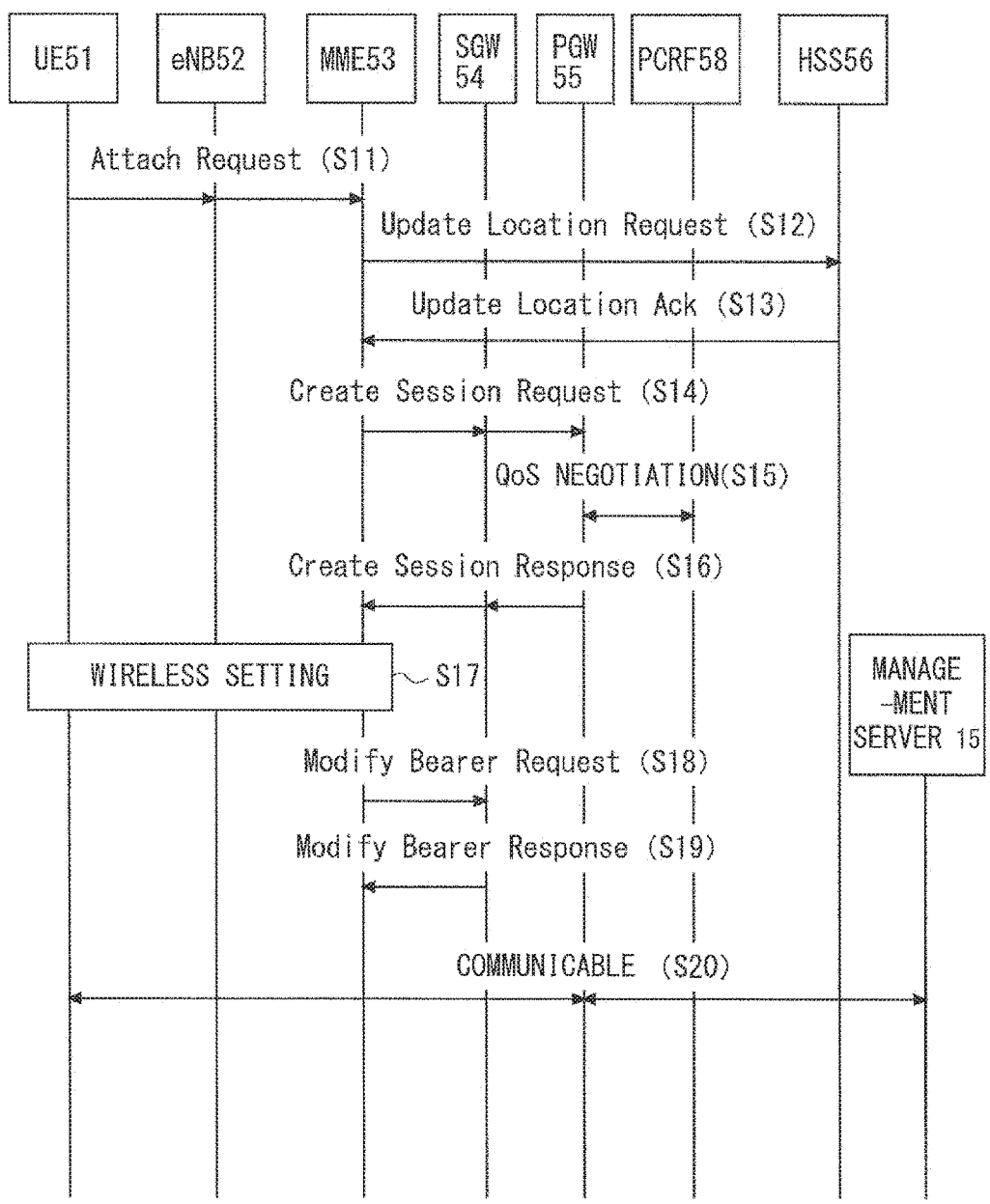
FIG. 4 is a diagram showing a flow of an Attach procedure according to the second embodiment.

In FIG. 4, the flow of the Attach procedure to enable the UE 51 to communicate with the management server 15 has been described. However, the UE 51 may also perform the process for enabling the IMS, the Internet communication, and the like in a manner similar to the above-described process. Alternatively, as shown in FIG. 4, when the Attach procedure for enabling the UE 51 to communicate with the management server 15 is performed, the IMS, the Internet communication, and the like may be enabled at the same time.

Figure 5:
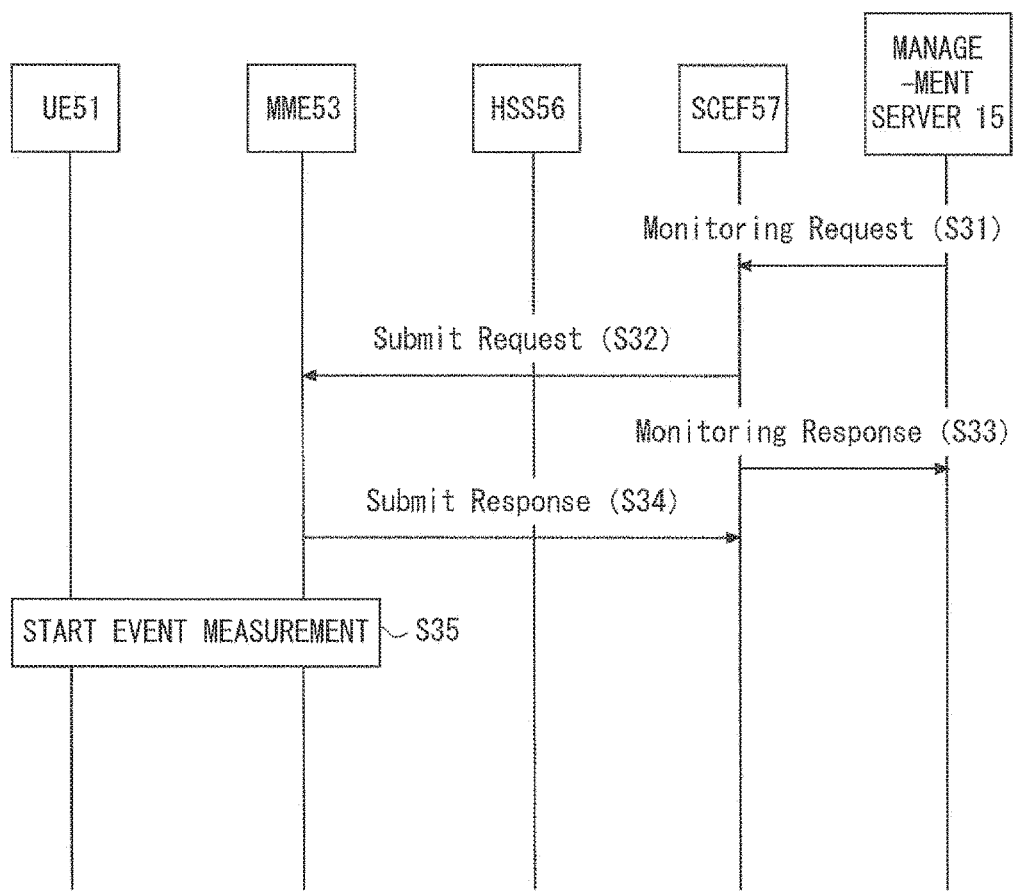
FIG. 5 is a diagram showing a flow of an event measurement start procedure according to the second embodiment.

Next, a flow of an event measurement start procedure according to the second embodiment of the present disclosure will be described with reference to FIG. 5. In FIG. 5, the monitoring process of the terminal described in 3GPP TR 23.789 V1.0.0 (2014-12) 6.3 is used. In FIG. 5, a flow of preprocessing for the management server 15 to detect the act of the user holding the UE 51 using the UE 51 while walking will be described.

First, the management server 15 transmits a Monitoring Request message to the SCEF 57 (S31) in order to request the EPS to monitor whether or not the user holding the UE 51 is walking. Next, the SCEF 57 transmits, to the MME 53, a Submit Request message instructing the MME 53 to monitor, for example, changes in the position information on the UE 51 as monitoring contents of the UE 51 (S32). The SCEF 57 may transmit the Submit Request message to the MME 53 via the HSS 56. Next, in response to the Monitoring Request message, the SCEF 57 transmits a Monitoring Response message to the management server 15 (S33). Next, in response to the Submit Request message, the MME 53 transmits a Submit Response message to the SCEF 57 (S34).

Next, when the MME 53 receives the Submit Request message, it starts event measurement on the UE 51 (S35). The event measurement may be, for example, monitoring whether or not the UE 51 is moving. For example, the movement of the UE 51 may be detected by the MME 53 detecting changes in a Global Cell ID of a cell on which the UE 51 is camping, changes in a TA (Tracking Area) on which the UE 51 is camping, changes in an RA (Routing Area) on which the UE 51 is camping, and the like. That is, when the event measurement is started in Step S35, the MME 53 monitors whether or not the position of the UE 51 has changed.

Figure 6:
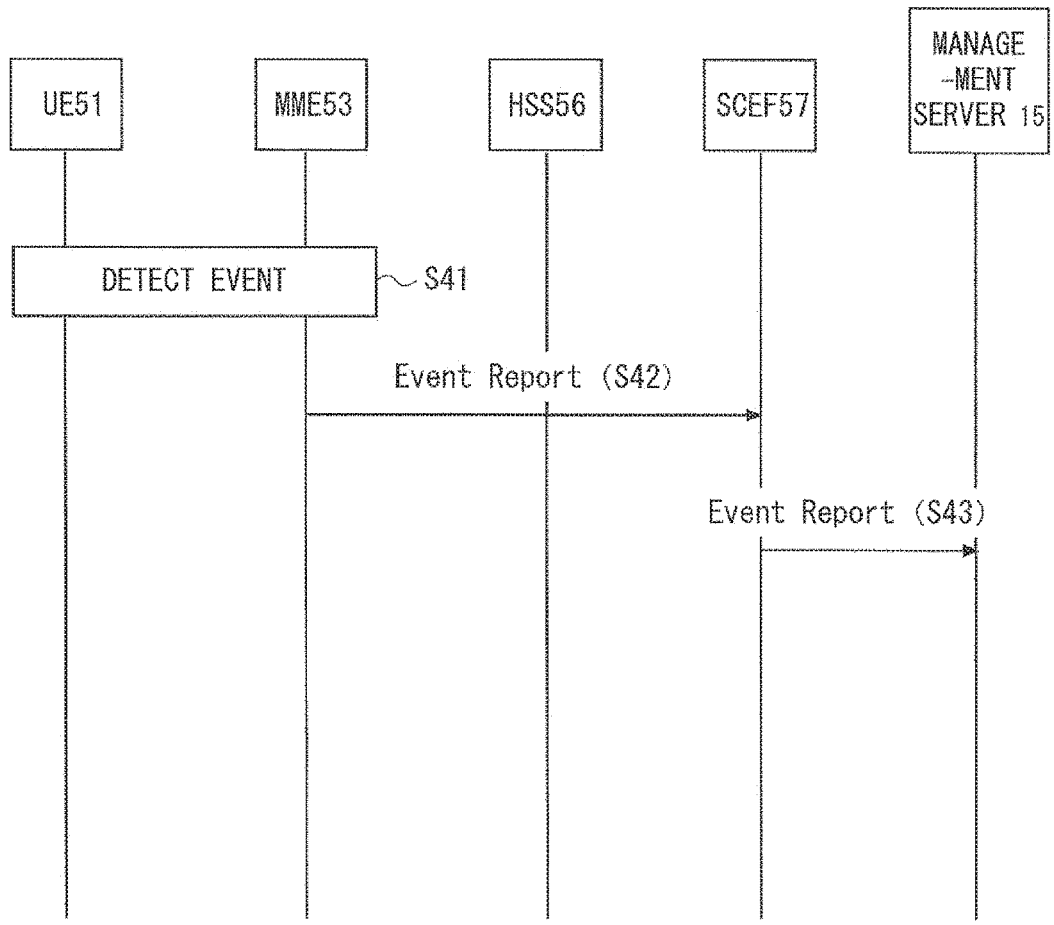
FIG. 6 is a diagram showing a flow of an event detection procedure according to the second embodiment.

Next, a flow of an event detection procedure according to the second embodiment of the present disclosure will be described with reference to FIG. 6. Firstly, the MME 53 detects an event indicating that the UE 51 has moved by a change in the Global Cell ID, a change in the TA, a change in the RA, or the like (S41). Next, when the MME 53 detects the event indicating that the UE 51 has moved, it transmits an Event Report message in which a result of the detection of the event is set to the SCEF 57 (S42). The MME 53 may transmit the Event Report message to the SCEF 57 via the HSS 56. Next, the SCEF 57 transmits the Event Report message transmitted from the MME 53 to the management server 15 (S43).

Next, a flow of a procedure for stopping the communication related to the UE 51 according to the second embodiment of the present disclosure will be described with reference to FIG. 7. Firstly, the management server 15 determines to stop the communication related to the UE 51 using the result of detection of the event, which is transmitted from the SCEF 57, and the result of the analysis on the sensor information, which is transmitted from the UE 51 after the management server 15 becomes communicable with the UE 51 in Step S20 of FIG. 4 (S51). For example, when the analysis result on the sensor information transmitted from the UE 51 indicates that the user is walking, and a movement of the UE 51 is confirmed also from the detection result of the event transmitted from the SCEF 57, the management server 15 may evaluate that the user holding the UE 51 is walking and determine to stop (suspend) the communication related to the UE 51.

For example, when a movement of the UE 51 is confirmed from the detection result of the event transmitted from the SCEF 57, and the analysis result on the sensor information transmitted from the UE 51 indicates that the UE 51 is moving by a train, the management server 15 may determine to continue the communication related to the UE 51.

Next, the management server 15 transmits, to the SCEF 57, a Suspend Request message instructing the SCEF 57 to stop the communication related to the UE 51 (S52). For example, the management server 15 may determine the communication to be stopped for each APN to which the UE 51 is connected or for each service flow identified by a transmission source and a transmission destination IP address or a port number and the like. The management server 15 sets the APN or the service flow, for which the communication is to be stopped, in the Suspend Request message (S52).

For example, the management server 15 may not designate the voice communication to which the IMS is specified as the APN as the communication to be stopped. Instead, when the external service network 62 is specified as the APN, the management server 15 may determine to stop the corresponding communication. That is, the user may exclude the voice communication in which the user can secure a wide field of view from the communication to be stopped.

Further, the management server 15 may determine whether or not to grant the communication related to the UE 51 according to a time period. For example, the management server 15 may determine to stop (suspend) the communication related to the UE 51 from 9 am to 12 am and from 1 pm to 5 pm which correspond to the user's work time or school time. Alternatively, the management server 15 may combine a plurality of evaluation criteria in order to determine whether or not to stop the communication related to the UE 51.

Next, the SCEF 57 transmits, to the PCRF 58, the Suspend Request message in which the APN or the service flow corresponding to the communication to be stopped is set (S53). When there are a plurality of the PCRFs 58 that control APNs to be stopped, the SCEF 57 may transmit the Suspend Request message to the plurality of PCRFs 58. Next, the PCRF 58 transmits, to the PGW 55, a PCC rule provisioning message in which the APN or the service flow corresponding to the communication to be stopped is set (S54). This APN or the service flow has been set in the received Suspend Request message. When there are a plurality of PGWs 55 that control APNs, for which the communication is to be stopped, the PCRF 58 may transmit the PCC rule provisioning message to the plurality of PGWs 55.

Next, in response to the PCC rule provisioning message, the PGW 55 transmits an Ack message to the PCRF 58 (S55). Next, in response to the Suspend Request message, the PCRF 58 transmits a Response message to the SCEF 57 (S56). Next, in response to the Suspend Request message, the SCEF 57 transmits a Response message to the management server 15 (S57).

The PGW 55 stops the communication corresponding to the APN or the service flow to be stopped set in the PCC rule provisioning message, which has been received in Step S54.

Figure 7:
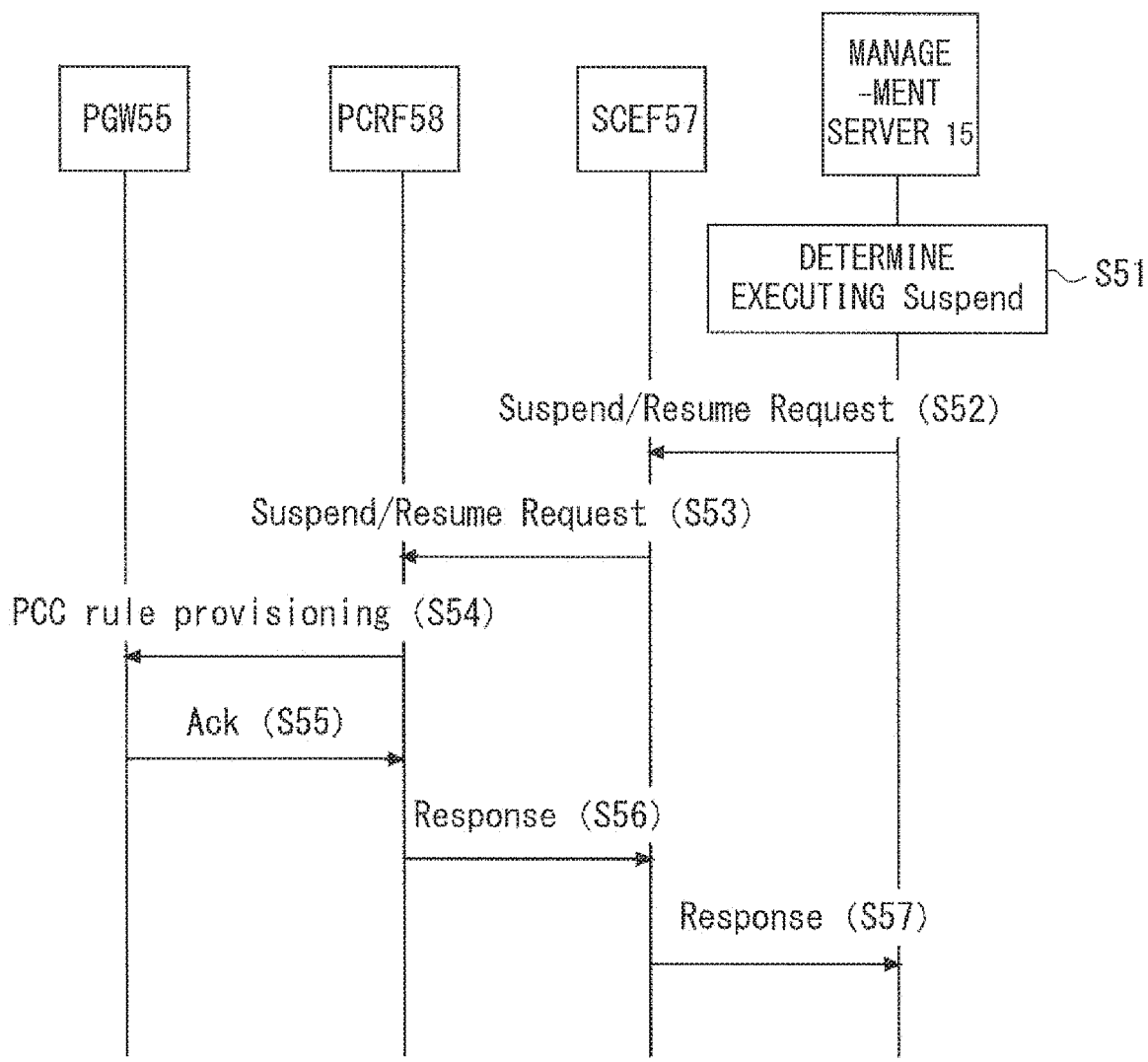
FIG. 7 is a diagram showing a flow of a procedure for stopping communication related to a UE according to the second embodiment.

In FIG. 7, an example is described in which the management server 15 transmits the Suspend Request message to the SCEF 57 after the communication related to the UE 51 is stopped. However, the management server 15 may determine to resume the stopped communication related to the UE 51 in Step S51. In this case, the management server 15 transmits a Resume Request message to the SCEF 57, and the SCEF 57 also transmits the Resume Request message to the PCRF 58.

Further, a QoS Request message defined by 3GPP may be used for the Suspend Request message and the Resume Request message transmitted and received between the management server 15 and the PCRF 58.

The flow of the procedure for stopping the communication related to the UE 51 according to the second embodiment of the present disclosure has been described above with reference to FIG. 7. However, in parallel to this procedure, the management server 15 may notify the UE 51 of information including a communication restriction state, i.e., whether the communication has been stopped or resumed. The user holding the UE 51 can confirm the communication restriction state on the warning message on the screen displayed by the screen control unit 76 based on the information transmitted from the management server 15 to the UE 51.

Figure 8:
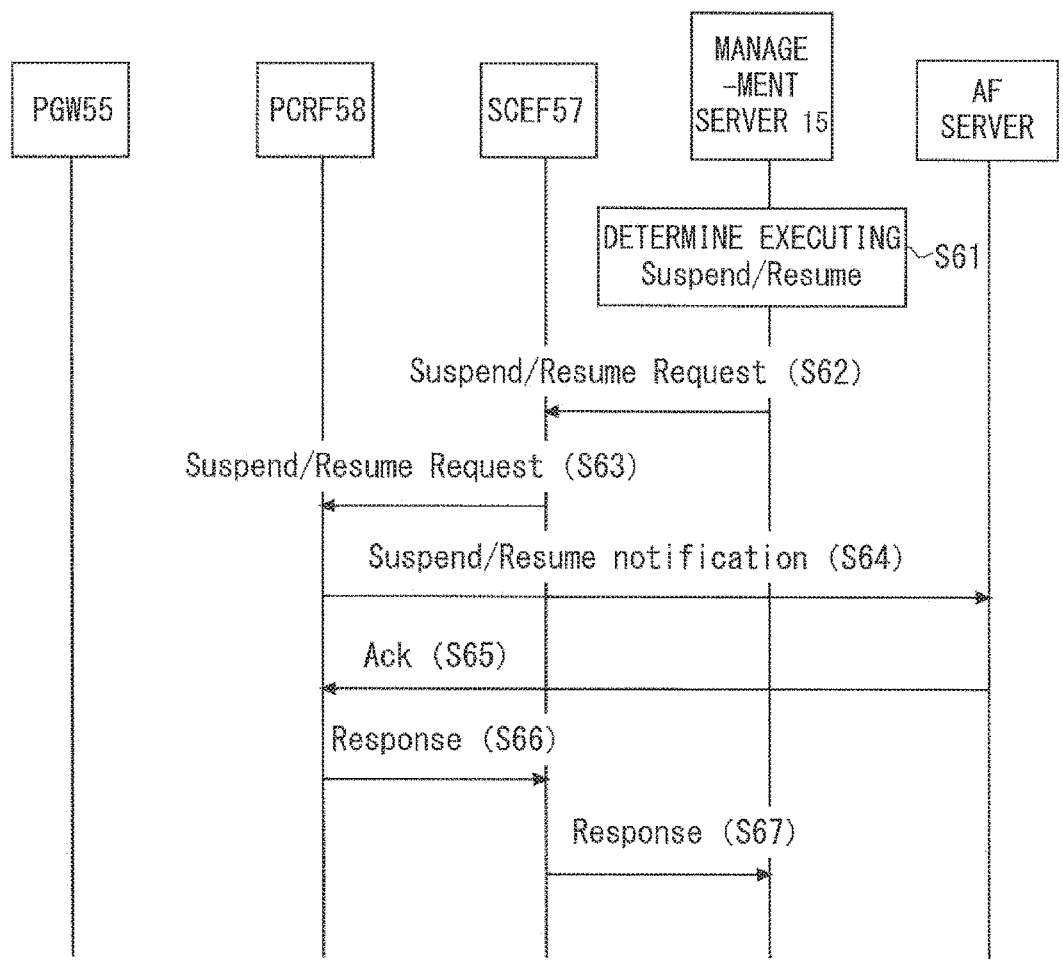
FIG. 8 is a diagram showing a flow of a procedure for stopping communication related to a UE according to the second embodiment.

Next, a flow of a procedure for stopping the communication related to the UE 51 according to the second embodiment of the present disclosure, which differs from FIG. 7, will be described with reference to FIG. 8. FIG. 8 shows a flow of a procedure when the management server 15 stops a specific service related to the UE 51. The specific service is, for example, a voice service in which call processing control is performed by IMS. Further, an AF (Application Function) server of FIG. 8 is assumed to be a server constituting the IMS.

Steps S61 to S63 are the same as Steps S51 to S53 of FIG. 7, respectively, and thus detailed descriptions thereof will be omitted. In Steps S62 and S63, it is assumed that the IMS is specified as the APN for which the communication is to be stopped When the PCRF 58 receives the Suspend Request message from the SCEF 57, it transmits a Suspend Notification message to the AF server which is a server constituting the IMS corresponding to the communication to be stopped (S64). Next, in response to the Suspend Notification message, the AF server transmits an Ack message to the PCRF 58 (S65). Next, in response to the Suspend Request message, the PCRF 58 transmits a Response message to the SCEF 57 (S66). Next, in response to the Suspend Request message, the SCEF 57 transmits a Response message to the management server 15 (S67).

The AF server stops the communication corresponding to the communication to be stopped which is set in the Suspend notification message received in Step S64. For example, when the AF server determines to stop the voice communication, the AF server may notify a caller that the user holding the UE 51, who is a receiver, is currently moving and may transmit a message for allowing the caller to choose whether or not to continue call processing.

Further, in FIG. 8, like FIG. 7, a procedure for resuming the stopped communication related to the UE 51 may be executed. In this case, in Steps S62 and S63, a Resume Request message is transmitted. In Step S64, a Resume notification message is transmitted.

The flow of the procedure for stopping the communication related to the UE 51 according to the second embodiment of the present disclosure has been described above with reference to FIG. 8. However, in parallel to this procedure, the management server 15 may notify the UE 51 of information including a communication restriction state, i.e., whether the communication has been stopped or resumed. The user holding the UE 51 can confirm the communication restriction state on the warning message on the screen displayed by the screen control unit 76 based on the information transmitted from the management server 15 to the UE 51.

Figure 2:
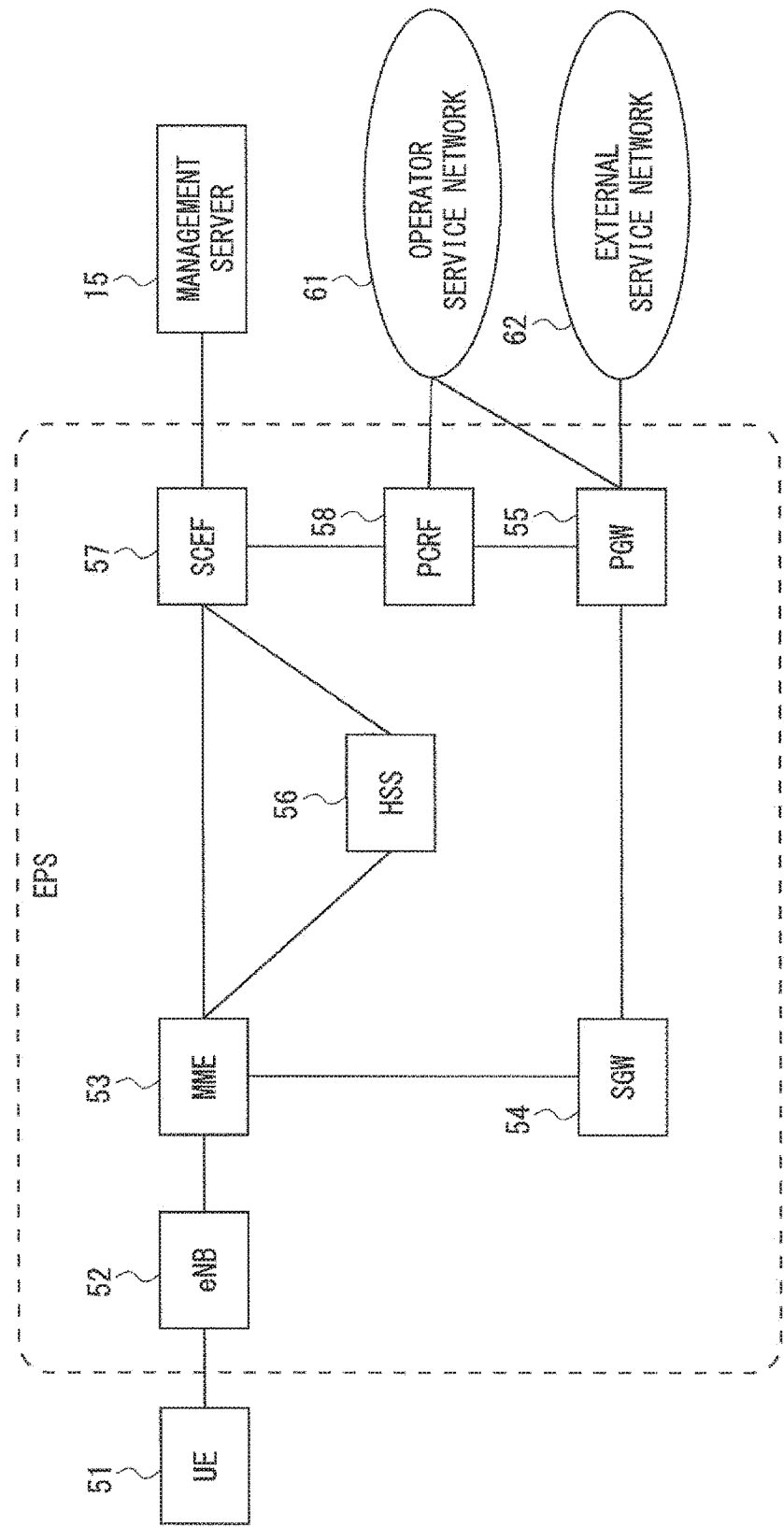
FIG. 2 is a configuration diagram of a communication system according to a second embodiment.

As described above, by using the communication system shown in FIG. 2, the management server 15 can detect whether or not the user holding the UE 51 is walking and then stop the communication related to the UE 51 by using the event information, which is transmitted from the network and is defined by 3GPP, and the analysis information generated in the UE 51.

Moreover, in the second embodiment, the behavior of the UE 51 can be analyzed in detail as compared to the first embodiment by using the event information detected in the EPS and the analysis information generated in the UE 51.

Additionally, the management server 15 can resume the UE which stopped communication. In this way, the network is in control to stop and resume the communication of the UE.

Figure 9:
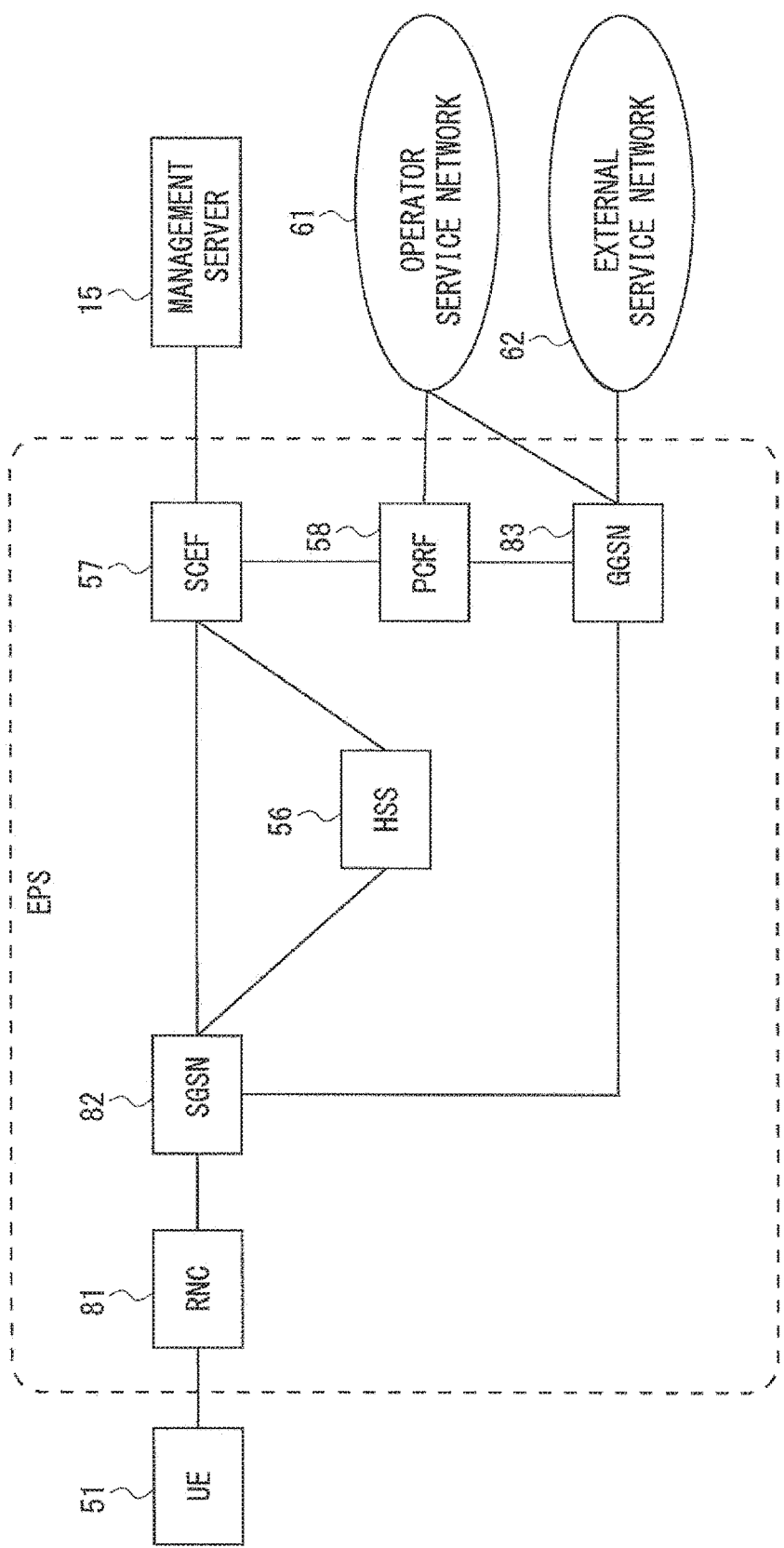
FIG. 9 is a configuration diagram of a communication system according to the second embodiment.

In the second embodiment, the configuration of the EPS (Evolved Packet System) using the eNB 52, the MME 53, the SGW 54, and the PGW 55 is shown. However, in place of the EPS, a network capable of accommodating a so-called third generation wireless access system using a Radio Network Controller (RNC) 81, a Serving General packet radio service Support Node (SGSN) 82, and Gateway General Packet Radio Service Support Node (GGSN) 83 shown in FIG. 9 may be used.

In the above embodiments, the present disclosure has been described as a hardware configuration, but the present disclosure is not limited to this. The present disclosure can be implemented by causing a CPU (Central Processing Unit) to execute a computer program that performs processing in the communication terminal 40 (e.g., the UE 51), the management apparatus 10 (e.g., the management server 15) or the core network 30 (e.g., the core network apparatus 20).

In the above example, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the present disclosure is not limited to the above embodiments, and modifications can be made as appropriate without departing from the scope thereof.

Although the present disclosure has been described with reference to the embodiments, the present disclosure is not limited by the above. Various modifications and changes, understood by those skilled in the art within the scope of the present disclosure, can be made to the configurations and details of the present disclosure The present application is based upon and claims the benefit of priority from Japanese Patent Application No. 2015-057346, filed on Mar. 20, 2015, the entire contents of which are hereby incorporated by reference.

REFERENCE SIGNS LIST

10 MANAGEMENT APPARATUS
11 RECEPTION UNIT
12 TRANSMISSION UNIT
13 EVALUATION UNIT
15 MANAGEMENT SERVER
20 CORE NETWORK APPARATUS
21 COMMUNICATION CONTROL UNIT
22 COMMUNICATION UNIT
30 CORE NETWORK
40 COMMUNICATION TERMINAL
51 UE
52 eNB
53 MME
54 SGW
55 PGW
56 HSS
57 SCEF
58 PCRF
61 OPERATOR SERVICE NETWORK
62 EXTERNAL SERVICE NETWORK
71 GRAVITY/GYRO SENSOR
72 SPEED/ACCELERATION SENSOR
73 POSITIONING APPARATUS
74 BACKGROUND NOISE SENSOR
75 BEHAVIOR MONITORING APPLICATION
76 SCREEN CONTROL UNIT
77 COMMUNICATION UNIT
81 RNC
82 SGSN
83 GGSN

The invention claimed is:

1. A management apparatus comprising:
a controller configured to determine to stop communication related to a first communication terminal based on a detection that the first communication terminal is moving; and
a transmitter configured to:
send information related to a communication restriction state to the first communication terminal, the information indicating whether the communication has been stopped or resumed, and
send a notification message, based on the detection that the first communication terminal is moving, to a second communication terminal in response to a communication signal from the second communication terminal to the first communication terminal, the notification message indicating that the first communication terminal is moving; and a receiver configured to:
  receive sensor information from the first communication terminal comprising a background noise sensor, the sensor information from the first communication terminal being an output of the background noise sensor, wherein
  the detection that the first communication terminal is moving is based on the sensor information.

2. The management apparatus according to claim 1, wherein the controller is configured to exclude a voice communication from the communication to be stopped.

3. The management apparatus according to claim 1, wherein the controller determines to stop the communication for at least one specific service to the first communication terminal.

4. The management apparatus according to claim 1, wherein the communication signal from the second communication terminal to the first communication terminal comprises a telephone call signal.

5. A first communication terminal comprising:
  a receiver configured to receive information related to a communication restriction state from a management server, the information indicating whether communication related to the first communication terminal has been stopped or resumed;
  a monitor configured to display a message on a screen of the first communication terminal based on the received information; and
  a background noise sensor configured to output sensor information for a detection that the first communication terminal is moving, wherein
    the first communication terminal is configured to be controlled to communicate with a network based on the detection that the first communication terminal is moving, and
    a notification message is transmitted, based on the detection that the first communication terminal is moving, to a second communication terminal in response to a communication signal from the second communication terminal to the first communication terminal, the notification message indicating that the first communication terminal is moving.

6. The first communication terminal according to claim 5, wherein the first communication terminal is configured to enable a voice communication during the communication restriction state.

7. The first communication terminal according to claim 5, wherein the first communication terminal is configured to be controlled to communicate with the network for at least one specific service to the first communication terminal.

8. The first communication terminal according to claim 5, wherein the communication signal from the second communication terminal to the first communication terminal comprises a telephone call signal.

9. A communication control method comprising:
  collecting sensor information from a first communication terminal comprising a background noise sensor, the sensor information collected from the first communication terminal is an output of the background noise sensor;
  analyzing the sensor information for a detection that the first communication terminal is moving;
  receiving information related to a communication restriction state from a management server, the information indicating whether communication related to the first communication terminal has been stopped or resumed; and
  displaying, via a monitor, a message on a screen of the first communication terminal based on the received information, wherein
    the first communication terminal is configured to be controlled by the management server to communicate with a network based on the detection that the first communication terminal is moving, and
    a notification message is transmitted, based on the detection that the first communication terminal is moving, to a second communication terminal in response to a communication signal from the second communication terminal to the first communication terminal, the notification message indicating that the first communication terminal is moving.

10. The communication control method according to claim 9, wherein the first communication terminal is configured to enable a voice communication during the communication restriction state.

11. The communication method according to claim 9, wherein the first communication terminal is configured to be controlled by the management server to communicate with the network for at least one specific service to the first communication terminal.

12. The communication method according to claim 9, wherein the communication signal from the second communication terminal to the first communication terminal comprises a telephone call signal.

* * * * *